United States Patent
Von Wendorff (10) Patent No.: US 9,454,424 B2
(45) Date of Patent: Sep. 27, 2016

(54) METHODS AND APPARATUS FOR DETECTING SOFTWARE INTEFERENCE

(71) Applicant: Wilhard Christophorus Von Wendorff, Munich (DE)

(72) Inventor: Wilhard Christophorus Von Wendorff, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 147 days.

(21) Appl. No.: 14/469,775

(22) Filed: Aug. 27, 2014

(65) Prior Publication Data

US 2016/0062810 A1   Mar. 3, 2016

(51) Int. Cl.
G06F 11/00 (2006.01)
G06F 11/07 (2006.01)
G06F 11/34 (2006.01)
G06F 11/30 (2006.01)

(52) U.S. Cl.
CPC ......... *G06F 11/079* (2013.01); *G06F 11/0721* (2013.01); *G06F 11/3024* (2013.01); *G06F 11/3055* (2013.01); *G06F 11/348* (2013.01); *G06F 11/3409* (2013.01); *G06F 2201/86* (2013.01); *G06F 2201/865* (2013.01)

(58) Field of Classification Search
CPC ............. G06F 11/076; G06F 11/0754; G06F 11/0757; G06F 2201/88
See application file for complete search history.

(56) References Cited

U.S. PATENT DOCUMENTS

| 4,086,816 | A | * | 5/1978 | Jon | G01N 29/14 73/587 |
|---|---|---|---|---|---|
| 4,392,021 | A | * | 7/1983 | Slate | H04K 1/06 380/216 |
| 4,435,759 | A | | 3/1984 | Baum et al. | |
| 5,560,023 | A | * | 9/1996 | Crump | G06F 1/3203 713/321 |
| 5,752,062 | A | | 5/1998 | Gover et al. | |
| 2009/0007134 | A1 | * | 1/2009 | Chiu | G06F 11/3409 718/106 |
| 2014/0122834 | A1 | * | 5/2014 | Ganguli | G06F 11/3433 712/30 |

OTHER PUBLICATIONS

Freescale Semiconductor, Inc., "e200z760n3 Power Architecture: Chapter 8: Performance Monitor," Core Reference Manual e200z760RM, Rev. 2, Jun. 2012; pp. 364-387.
Koh, Y. et al., "An Analysis of Performance Interference Effects in Virtual Environments," IEEE International Symposium on Performance Analysis of Systems & Software, 2007, ISPASS 2007, 10 pages.

(Continued)

*Primary Examiner* — Bryce Bonzo
*Assistant Examiner* — Jonathan Gibson (57) ABSTRACT

The present application relates to an apparatus for detecting software interference and the method of operating thereof. A processor and at least one shared resource form a computing shell to execute a first, functional safety critical application and at least one second application in time-shared operation. One or more performance counters are provided to adjust a counter value in response to a performance related event. A reference value storage stores one or more threshold values, each of which is associated with one of the performance counters. A comparator receives the performance counter values, compares the performance counter values with the respective threshold values and generates at least one comparison signal in response to results of the comparisons. An interference indication generator receives the at least one comparison signal and generates at least one interference indication in response to the at least one received comparison signal.

11 Claims, 6 Drawing Sheets

(56) References Cited

OTHER PUBLICATIONS

Saad, E. et al., "FPGA-Based Software Profiler for Hardware/Software Co-design," 26th National Radio Science Conference (NRSC 2009); Future University, 5th Compound, New Cairo, Egypt; Mar. 17-19, 2009; 8 pages.

Shannon, L. et al., "Using Reconfigurability to Achieve Real-Time Profiling for Hardware/Software Codesign," FPGA '04; Feb. 22-24, 2004; Monterey, California, USA; downloaded from <<http://www2.ensc.sfu.ca/~lshannon/file/final_fpga_04.pdf>>, 10 pages.

Suresh, D. et al., "Loop Level Analysis of Security and Network Applications," downloaded from <<http://www.researchgate.net/publication/237133453_Loop_Level_Analysis_of_Security_and_Network_Applications/links/00b7d526a03f27ce37000000>> on Aug. 21, 2014, 7 pages.

Tabatabaee, V. et al., "Automatic Software Interference Detection in Parallel Applications," SC07; Nov. 10-16, 2007; Reno, Nevada, USA; ACM 978-1-59593-764-3/07/0011; downloaded from <<http://sc07.supercomputing.org/schedule/pdf/pap200.pdf>>, 12 pages.

Tong, J. et al., "Profiling Tools for FPGA-Based Embedded Systems: Survey and Quantitative Comparison," Journal of Computers, vol. 3, No. 6, Jun. 2008; 14 pages.

\* cited by examiner

Fig. 11 ns of the present application;
METHODS AND APPARATUS FOR DETECTING SOFTWARE INTEFERENCE

FIELD OF THE INVENTION

The field of this invention relates to methods and apparatus for detecting application interference, and in particular for detecting performance interference whilst, for example, processing a safety critical application.

BACKGROUND OF THE INVENTION

Generally, when executing software that requires different safety integrity levels, measures need to be put in place to reduce a risk of interference. Typically, issues of interference arise when one safety critical task interferes with a second safety critical task, causing potentially dangerous malfunctions to software-based processes due to reduced processing performance resulting in a reduced progressing progress of at least one of the safety critical tasks.

Worst case execution time (WCET) is typically used for understanding timing behaviour of software where it is important for reliability or correcting functional behaviour. Calculating WCET generally involves generating approximations, which usually includes overestimation when there are uncertainties. Therefore, in practice the exact WCET itself is often regarded as unobtainable. For modern systems, utilising WCET can require a huge effort and can lead to inefficient implementations due to the involved approximations and worst case assumptions.

Targeting performance domain interference of software executed either in a time sharing manner by a single computing shell or on different computing shells integrated in a multiprocessor system, requires quantifying disturbances that are due to interferences in the performance domain. Interferences can occur due to sharing of state based resources, for example, having bi-stable elements or concurrent access to shared resources.

Current methods generally measure a time duration that a specific software task requires for execution. Unfortunately, state of the art processing shells are less and less deterministic in the time domain, and execution time relies heavily on executed instructions, the processed data, and the process circumstances. Therefore, as a result, time windows for time domain performance monitoring have to be ever wider and wider.

SnoopP is an on-chip, functional level, non-intrusive profiler for software applications running on soft-core processors. SnoopP comprises a user-specified variable number of segment counters that are used to measure a number of clock cycles spent in executing contiguous regions of memory. Each segment contains two comparators to check a value of the program counter between a specified low and high address. If the value of the program counter is presently accessing an address within these bounds, then the counter value is incremented. A counter clocked by a central processing unit (CPU) clock and masked by logic, is utilised to validate if a CPU program counter is within a given range. This enables the counter to assess the CPU time spend within the user specified address space.

In general, this is used for profiling purposes, to identify the code section that processing elements spend most of the CPU time. However, it is known that this approach is sensitive to non-deterministic behaviour (e.g. data dependent execution time) and, therefore, provides only a limited diagnostic coverage. As this approach only accumulates the total CPU time spend to process the instructions within a given instruction address range, it is prone to all types of non-determinism of computer processing. This approach does not differentiate the CPU time spend for example on only fetching data, fetching instructions, processing interrupts, CPU stall cycles, number of instructions completed, number of memory accesses (by type), number of instruction or data cache misses, number of cycles with multiple instructions issue, number of instructions in a given class completed (load/store instructions, branch/subroutine/return instructions, integer, floating point instructions, etc.), cache line fills, and calling subroutines, As these different CPU times are differently influenced by software interferences or hardware non-determinism this approach does not allow to tailor the CPU timeout window to the specific indicators of a software interference.

In summary, performance interference reduces the performance of a processing unit whilst processing a safety critical software task due to interference of a second software task having a different safety criticality. Current methods of performance interference monitoring are only generally handled by imprecise time-based measurements.

Current methods generally measure a time duration a specific software task requires to complete its execution (so called timeout watchdog or window watchdog). Unfortunately, state of the art processing shells are becoming less and less deterministic in the time domain. A reason for the reduction of execution time determinism may be due to more and more speculative operations performed within a core. In the case that these speculations are correct, the results are available earlier. However, in the case that these speculations are incorrect, the same instruction will take longer to process.

Further, the hierarchical memory system (cache) may also attempt to speculatively pre-fetch and store data and instructions. In the case that the speculative fetches were correctly predicted, execution time will be fast. However, performance may be significantly slowed down if the predicted behaviour did not correspond to the program behaviour.

The execution time relies heavily on the executed instructions, processed data and the number of context switches (interrupts) etc. As a result, the time windows for time domain performance monitoring have to be wider and wider.

SUMMARY OF THE INVENTION

The invention provides an apparatus and a method for detecting software interference of applications running within a computing shell as defined in the independent claims.

Specific embodiments of the invention are set forth in the dependent claims. These and other aspects of the invention will be apparent from and elucidated with reference to the examples described hereinafter.

BRIEF DESCRIPTION OF THE DRAWINGS

Further details, aspects and examples of the invention will be described, by way of illustration only, with reference to the drawings. Elements in the figures are illustrated for simplicity and clarity and have not necessarily been drawn to scale.

DETAILED DESCRIPTION OF THE EMBODIMENTS

Because the illustrated examples of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different examples capable of implementing different features. Specific examples of components and arrangements are described below to simplify and thus clarify the present disclosure. These are, of course, merely examples and are not intended to be limiting. In many instances, the features of one example may be combined with the features of other examples. In addition, the present disclosure may repeat reference numerals and/or signs in the various illustrative examples and in particular same reference numerals and/or signs may be used throughout the drawings. This repetition is for the purpose of simplicity and clarity.

Figure 1:
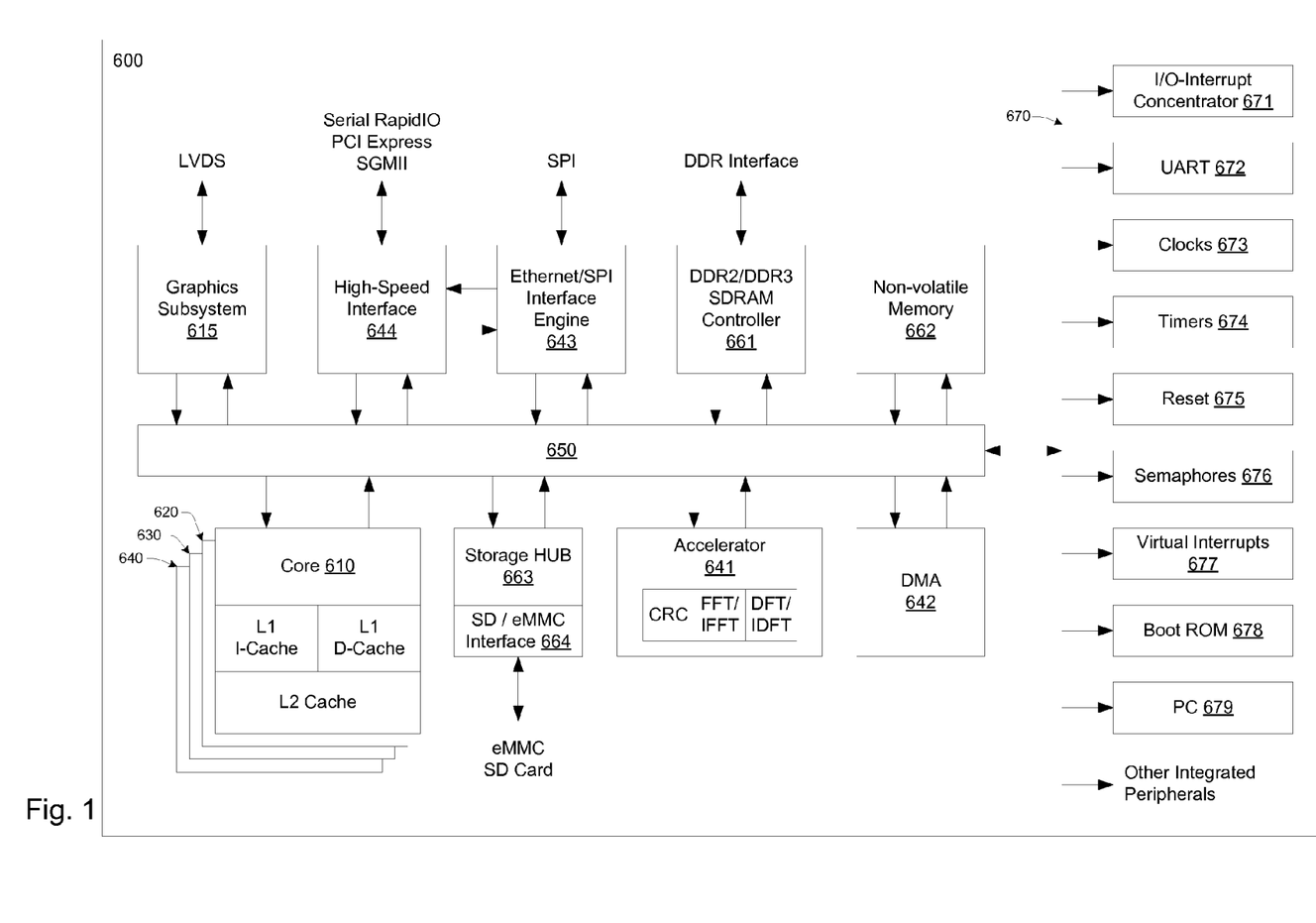
FIG. 1 schematically shows a processing device exemplified with respect to a system-on-chip (SoC) processing device.

Referring now to FIG. 1, there is shown a simplified schematic diagram of a multi-core system on chip 600 having multiple processor cores 610, 620, 630, 640. The multi-core system on chip 600 should be understood as one example of a data processing device or a data processing system in the context of the present application. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641 which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 650 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (e.g., a core may be virtualized).

As depicted, each processor core (e.g., processor core 610) may include a first level (L1) cache, which includes a data cache (D-Cache) and an instruction cache (I-Cache). In addition, a second level of cache memory (L2) may also be provided at each core, though the L2 cache memory can also be an external L2 cache memory, which is shared by one or more processor cores. The processor core 610 executes instructions and processes data under control of the operating system (OS), which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown).

The processor cores 610, 620, 630, 640 and accelerator 641 are in communication with the interconnect bus 650, which manages data flow between the cores and the memory. The interconnect bus 650 may be configured to concurrently accommodate a large number of independent accesses that are processed on each clock cycle, and enables communication data requests from the processor cores 610, 620, 630, 640 to external system memory and/or an on-chip non-volatile memory 662, as well as data responses therefrom. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the optional SOC internal memory 662 or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided, which controls the direct data transfers to and from system memory via memory controller 661.

The interconnect bus 650 is in communication with storage HUB 663 to provide access to mass storage (not shown). The storage HUB 663 may be configured to manage the transfer of data between the multi-core SoC 600 and mass storage units, for example. The storage HUB 663 may further include one or more interfaces specific for the technology used by the mass storage units. Herein, the storage HUB 663 is exemplarily illustrated to include a SD/eMMC Interface 664, which is provided to allow for access to SD (Secure Data), MMC (MultiMediaCard) cards (not shown) and/or eMMC (embedded MultiMediaCard) (not shown). Both storage technologies are implemented on the basis of non-volatile flash memory technology. In some embodiments, multiple instances of storage HUB 663 and/or interfaces provided with the storage HUB 663 may be implemented, with each instance configured to control a respective bank of system memory. Memory storage HUB 663 may be configured to interface to any suitable type of mass storage interfacing standards including in particular flash memory storage standards (SD, MMC), SAS (Serial Attached SCSI), SATA (Serial ATA) and the like.

The multi-core SoC 600 may comprise a dedicated graphics sub-system 200. The graphics sub-system 200 may be configured to manage the transfer of data between the multi-core SoC 600 and graphics sub-system 200, for example, through the interconnect bus 650. The graphics sub-system 200 may include one or more processor cores for supporting hardware accelerated graphics generation. The graphics generated by the graphics sub-system 200 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high speed serial interface 644 may be configured to support one or more serial RapidIO ports, a PCI-Express Controller, and/or a serial Gigabit Media Independent Interface (SGMII). In addition, one or more interfaces 670 may be provided, which are configured to couple the cores to external boot and/or service devices, such as I/O interrupt concentrators 671, UART device(s) 672, clock(s) 673, timer(s) 674, reset 675, hardware semaphore(s) 676, virtual interrupt(s) 677, Boot ROM 678, I2C interface 679, GPIO ports, and/or other modules.

Instructions for the operating system, applications, and/or programs may be in mass storage or memory, which are in communication with processor cores 610, 620, 630, 640 through communications fabric 650. In these illustrative examples, the instructions are in a functional form on a non-transitory tangible medium such as a persistent mass storage. These instructions may be loaded into memory for running by processor cores 610, 620, 630, 640. The processes of the different embodiments may be performed by processor unit 204 using computer implemented instructions, which may be in a memory. These instructions are referred to as program code, computer usable program code, or computer readable program code that may be read and run by one or more processor cores 610, 620, 630, 640 in the SoC 600. The program code in the different embodiments may be embodied on different physical or computer readable non-transitory tangible storage media.

Program code may be in a functional form on computer readable medium that may be selectively removable and may be loaded onto or transferred to data processing system for running by the one or more processor cores. Program code and computer readable medium form computer program product in these examples. In one example, computer readable medium may be computer readable non-transitory tangible storage medium. Computer readable storage medium may include, for example, an optical or magnetic disk that may be inserted or placed into a drive or other device that may be part of persistent storage for transfer onto a mass storage device, such as a hard drive, that may be part of persistent storage. Computer readable storage medium also may take the form of a persistent storage, such as a hard drive, a thumb drive, or a flash memory, that may be operably coupled to data processing system. In some instances, computer readable storage medium may not be removable from data processing system.

Alternatively, program code may be transferred to data processing system using computer readable signal medium. Computer readable signal medium may be, for example, a propagated data signal containing program code. For example, computer readable signal medium may be an electromagnetic signal, an optical signal, and/or any other suitable type of signal. These signals may be transmitted over communications links, such as wireless communication links, optical fiber cable, coaxial cable, a wire, and/or any other suitable type of communications link. In other words, the communications link and/or the connection may be physical or wireless in the illustrative examples.

In some illustrative embodiments, program code may be downloaded over a network to a persistent medium from another device or data processing system through computer readable signal medium for use within data processing system. For instance, program code stored in a computer readable non-transitory tangible storage medium in a server data processing system may be downloaded over a network from the server to data processing system. The data processing system providing program code may be a server computer, a client computer, or some other device capable of storing and transmitting program code.

The different components illustrated for data processing system are not meant to provide architectural limitations, to the manner in which different embodiments may be implemented. The different illustrative embodiments may be implemented in a data processing system including components in addition to or in place of those illustrated for data processing system. The different embodiments may be implemented using any hardware device or system capable of running program code.

As another example, a storage device in data processing system may be any hardware apparatus that may store data. Memory, persistent storage, and computer readable medium are examples of storage devices in a tangible form, in particular in a non-transitory tangible form. In another example, a bus system may be used to implement communications fabric and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory, or a cache, such as found in an interface and memory controller hub that may be present in communications fabric.

According to an example of the present invention an approach to introduce a performance domain measurement instead of a time domain measurement for detecting interferences during time-shared execution of two or more application tasks in a common computing shell providing resources shared among the executed tasks is suggested. The term "performance" may be understood as the amount of useful work accomplished by the common computing shell compared to the time required for execution. Herein, the term "computing shell" or "shell" should be understood to comprise all hardware components of a processing system, which are involved when instructions are executed, including for instance instruction memory, data memory, central processing unit, bus matrix connecting memory and bus, clock generation unit, reset and power up circuit, voltage regulators, interrupt generation and handling circuit.

Those skilled in the art immediately understand that the performance of a computing shell is inter alia determined by a response time upon invocation of hardware functionality (such as an interrupt call) and throughput, e.g., rate of processing. Delay in response time and/or reduced throughput may be experienced in particular when two or more separate applications are executed in multitasking mode, e.g., in accordance with a time-shared scheduling scheme, in a single common computing shell. The skilled person is aware that in the aforementioned case resources of the common computing shell are shared between the separate applications and application tasks, which instructions thereof are executed in a timely sequence. Sharing of resources between separate tasks causes necessarily interferences in the execution of a task due to changes in the state of the shared resources by a previously executed task, which results in delay(s) of the execution of the currently executed one. As long as the level of interferences is within a range, the processing of each task progresses and the tasks perform the programmatic functionalities within the required time window. However, in the case that the interference level is above a threshold the progress in the processing of one or more of the tasks may be delayed to such an extent that the programmatic functionalities are not performed anymore within the required time window.

In the field of hardware and software development, the use of information collected by so-called performance-monitoring tools is known. The performance data collected by the performance-monitoring tools enables the developers to better understand how the hardware elements within the computing shell operate and interoperate with the operating system and the separate applications and tasks thereof executed in multitasking mode. The performance-monitoring tools is attributed to the computer devices having become increasingly more complex. This growing complexity increases the difficulty of analyzing and understanding the dynamic behavior of the computer devices. When computer devices are built with low integration components, hardware monitoring techniques are able to access and analyze signals of interest for understanding the operation and performance of the computer devices during development of software. But as computer devices become more complex and highly integrated, these signals of interest can become inaccessible, many times being sealed within the packages of the components. Moreover, simulations of computer device behavior are incapable of providing a complete understanding of the performance of the computer device. For one, such simulations run at significantly lower speeds than actual computer device operation. Consequently, these simulations are unable to run large real applications within a useful period of time. Further, the simulations cannot aid in understanding flaws that are produced during the implementation of the design or during the manufacture of the computer device. In order to provide a window of visibility into the behavior of computer devices, microprocessors have begun to include on-chip performance counters for counting occurrences of important events during computer device operation. Important events can include, for example, cache misses, instructions executed, and I/O data transfer requests. These counters can be set to interrupt the microprocessor upon a count overflow. Typically, the microprocessors can also periodically examine the performance counters, and thereby evaluate the performance of the computer device.

Figure 2:
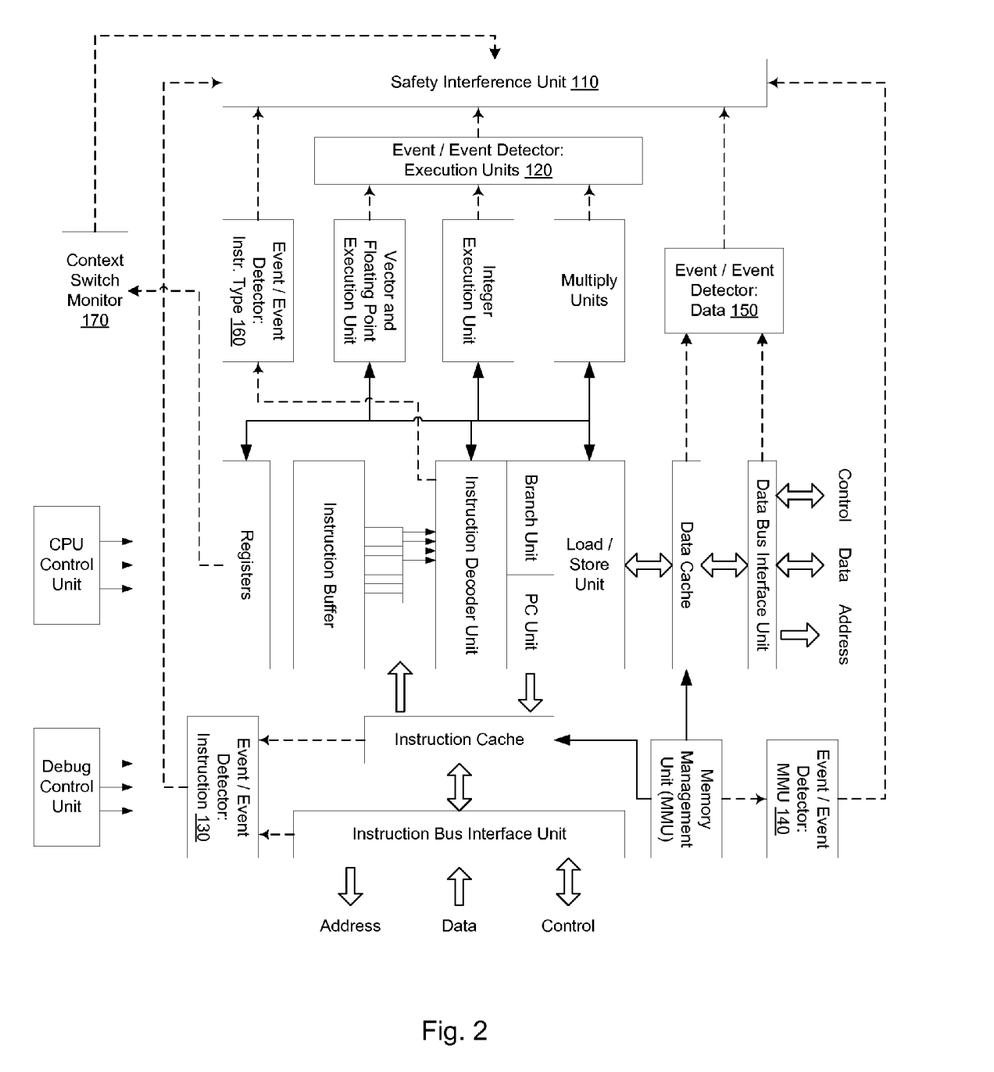
FIG. 2 schematically shows a high level block diagram of an exemplary processing device of the present application.

Referring now to FIG. 2, a high level block diagram of an exemplary processing device of the present invention is illustrated, which comprises at least one processor core 610, for exemplarily describing detection of performance related events and generation of event signals in response thereto. In this example, processor core 610 has been implemented with an integrated safety interference unit 110 to directly measure interference(s) occurring during simultaneous execution of tasks/applications within the computing shell provided by the processor core 610. The safety interference unit 110 will be described below in more detail. In some examples, the safety interference unit 110 may be situated outside of the processor core 100. The integrated safety interference unit 110 may be operable to utilize data obtained by respective detector circuits, which are implemented to detect and signalize performance related events.

For example a detector circuitry 130 may be operably coupled to the instruction cache and instruction bus interface unit, a detector circuitry 150 may be operatively coupled to the data cache and data bus interface unit, a detector circuitry 140 may be operatively coupled to the memory management unit (MMU), a detector circuitry 160 may be operatively coupled to the instruction decoding unit, a context switch detector circuitry 170 may be operatively coupled to the processor registers, and a detector circuitry 120 may be operatively coupled to a one or more processing units such as the floating point execution unit, the inter execution unit and/or the multiply unit.

For example, the number of cache misses and hits may be detected using the detector circuitries 130 and 150 operatively coupled to the cache such that the detector circuitries 130 and 150 are enabled to detect cache misses and hits within the respective caches. The detectors are configured to signalized events relating to cache misses and hits within the respective caches.

For example, the duration of bus arbitration delays may be detected using the detector circuitries 130 and 150 operatively coupled to instruction and data bus interface units such that the detector circuitries 130 and 150 are enabled to detect the bus interface being in waiting state for instance because at least one of the agents on the bus is not ready to participate in the communication. The detector circuitries are configured to signalize status events relating to bus arbitration delays, in response to which the length of such delays can be measured for instance by using a gated counter configured to count the number of e.g. clock cycles, which laps during a signalized status event relating to a bus arbitration delay.

For example, the duration of context switching delays may be detected using the detector circuitry embedded in the context switching monitor 170 and configured to signalize a context switch delay event. In analogy to the bus arbitration delay status event, the detector circuitry is configured to signalize the status events relating to the context switch delays, in response to which the length of such delays can be measured for instance by using a gated counter configured to count the number of e.g. clock cycles, which laps during a signalized status event relating to a context switching delay.

For example, the duration of a state change of the memory management unit (MMU) may be detected using the detector circuitry 140 operatively coupled to the memory management unit such that the detector circuitry 140 is enabled to signalize a state change event of the memory management unit (MMU). In analogy to the bus arbitration delay status event, the detector circuitry is configured to signalize the status events relating to the state changes, in response to which the length of such delays can be measured for instance by using a gated counter configured to count the number of e.g. clock cycles, which laps during a signalized status event relating to a state change.

For example, the duration of power saving may be detected using the detector circuitry operatively coupled to power control unit of a processor/processing core such that the detector circuitry is enabled to signalize a power saving state event. In particular the detector circuitry may be operatively coupled to a clock signal generation circuitry comprising a phase locked loop for clock signal generation. The detector circuitry is configured to determine a reduction of a clock frequency (e.g. by modification of the clock divider) and the detector circuitry supplies signal indicative of the power saving state event as long as the reduced clock cycle signal is active. In analogy to the aforementioned state events, the detector circuitry is configured to signalize the status events relating to the state changes, in response to which the length of such delays can be measured for instance by using a gated counter configured to count the number of e.g. clock cycles, which laps during a signalized state event relating to a power saving state.

For example, the latency of a service request/interrupt may be detected using a detector circuitry operatively coupled to the interrupt controller. The latency of a service request/interrupt may relate to the duration that is required after the service request/interrupt has been registered at an interrupt controller and the corresponding routine thereof is processed. The detector circuitry operatively coupled to the interrupt controller is enabled to signalize active/pending interrupt state events. In analogy to the aforementioned state events, the detector circuitry is configured to signalize the status events relating to the active/pending interrupts, in response to which the length of such latency can be measured for instance by using a gated counter configured to count the number of e.g. clock cycles, which laps during a signalized state event relating to active/pending interrupts. Hence as long as one or more un-serviced interrupts are active, pending or scheduled, the gated counter is enabled and the counter continues counting in accordance with the clock signal.

Figure 3:
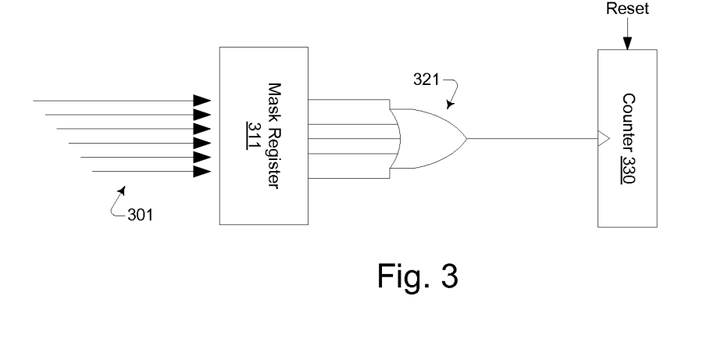
FIGS. 3 to 5 schematically show high level block diagrams of example performance counters according to the present application.
Figure 4:
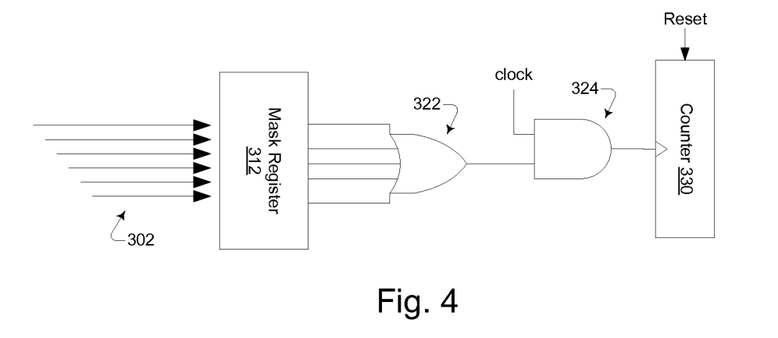
Figure 5:
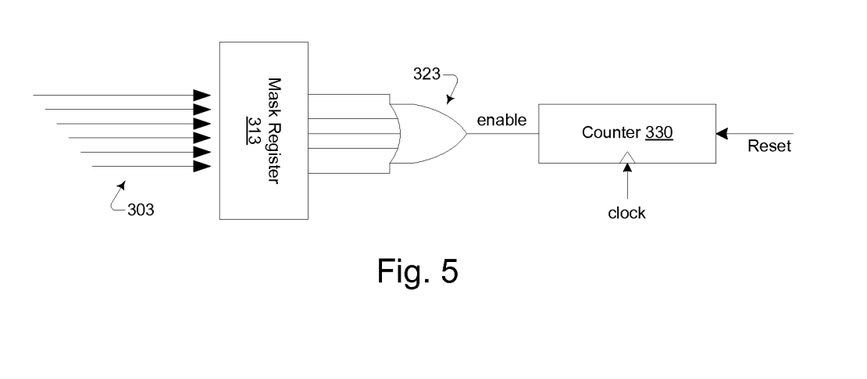

Referring now to FIGS. 3 to 5, schematic high level block diagrams of example event/performance counters are illustrated.

An exemplary event/performance counter implementation shown in FIG. 3 may receive a plurality of event signals 301, for example instruction/data cache miss event signals, instruction/data cache hit event signals, branch instructions and the like, which may be operably coupled into a mask register 311, for example a configurable mask register 311, which may be utilised for selecting the event signals of interest, for example using bitwise AND operations on the basis of a configurable selection register. The mask register 311 may be operably coupled to a logic module, for example a multiple input OR gate 321 as exemplarily illustrated, to combine the selected event signals. The combined signal outputted by the logic module is further supplied to one or more counter 330, which are operably coupled to the logic module. Each combined signal outputted by the logic module increases or decreases the counter value by a predefined increment/decrement value. The counter 330 may be resettable and/or pre-settable. The count value of the counter 330 may be further readable.

An exemplary state event/performance counter implementation shown in FIG. 4 may receive a plurality of state event signals 302, for example bus arbitration delay state events, context switching delay state events, state change state events, power saving state events and the like, which may be operably coupled into a mask register 312, for example a configurable mask register 312, which may be utilised for selecting the state event signals of interest, for example using AND operations on the basis of a configurable selection register. The mask register 312 may be operably coupled to a logic module, for example a multiple input OR gate 322 as exemplarily illustrated, to combine the selected state event signals. The combined signal outputted by the logic module is supplied to a further logic module, which operably coupled to the logic module. The further logic module, e.g. using AND operation, logically combines the combined signals with a clock signal. The resultant clock combined signal outputted by the further logic module is supplied to one or more counters 330, which increases or decreases the counter value by a predefined increment/decrement value. As a result of the clock combined signal, the counter is increased/decreased with each cycle of the clock signal as long as the states signalized by the selected state events are valid (or active or pending). The counter value represents a measure of the duration of the selected event states. The counter 330 may be resettable and/or pre-settable. The count value of the counter 330 may be further readable.

An exemplary service request/interrupt counter implementation shown in FIG. 5 may receive a plurality of signals 303 relating to registered interrupt requests. The registered interrupt request signals may be operably coupled into a mask register 313, for example a configurable mask register 313, which may be utilised for selecting the event signals of interest, for example using bitwise AND operations on the basis of a configurable selection register. The mask register 312 may be operably coupled to a logic module, for example a multiple input OR gate 322 as exemplarily illustrated, to combine the selected service request/interrupt request signals. The combined signal outputted by the logic module is supplied as an enabling signal to one or more counters 330, which operably coupled to the logic module. The combined signal outputted by the logic module is supplied to one or more counters 330, which increases or decreases the counter value by a predefined increment/decrement value in accordance with a clock signal supplied thereto. As a result of the combined signal, the counter is increased/decreased with each cycle of the clock signal as long as the selected service requests/interrupts are active (or pending). The counter value represents a measure of the active/pending time of the selected service requests/interrupts.

Figure 6:
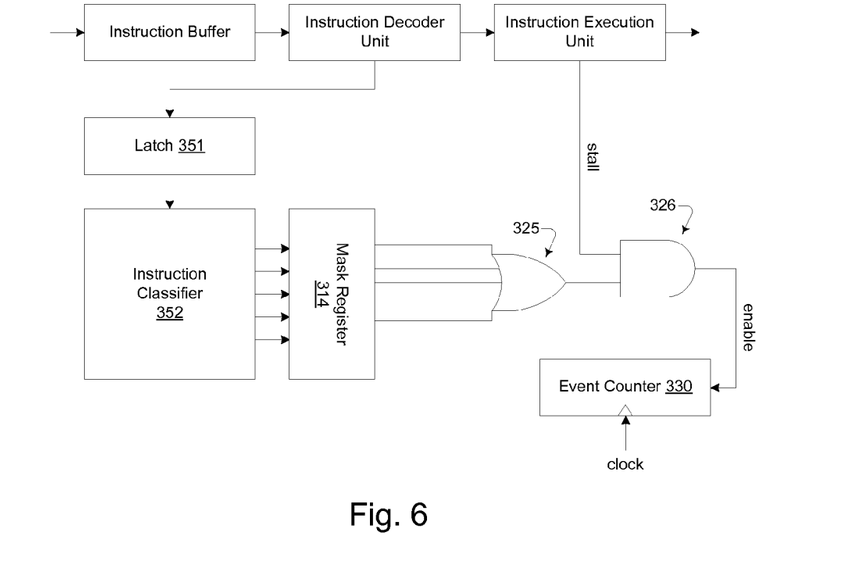
FIG. 6 schematically shows a high level block diagram of example performance counters for determining statistics about instruction execution according to the present application.

Referring to FIG. 6, a schematic high level block diagram of example performance counter is illustrated, which allows for determining execution-time statistics of the instruction execution. The instructions decoded by the instruction decoder of a processor/processor core may be latched and supplied to an instruction classifier 352, which generates one or more instruction classification signals in accordance with a predefined classification definition applied to the latched decoded instruction. The instruction classifier may be configurable. The one or more instruction classification signals may be further supplied to a configurable mask register 314, which may be utilised for selecting the instruction classification signals of interest, for example using AND operations on the basis of a configurable selection register. The mask register 312 may be operably coupled to a logic module, for example a multiple input OR gate 322 as exemplarily illustrated, to combine the selected instruction classification signals. The combined signal outputted by the logic module is supplied to a further logic module, which operably coupled to the logic module. The further logic module, e.g. using AND operation, logically combines the combined signals with a stall signal outputted by the instruction execution unit processing the decoded instructions. The resultant combined signal is supplied as an enabling signal to one or more counters 330, which increases or decreases the counter value by a predefined increment/decrement value in accordance with a clock signal supplied thereto. As a result of the combined signal, the counter is increased/decreased with each cycle of the clock signal as long as the instruction execution unit signalizes that the execution of the instruction is stalled. The instruction classifier may be applied to select instructions, which are executed at one or more specific instruction execution units including for instance the integer execution unit, the vector and floating point execution unit and the multiply unit. It is understood that the above described implementations described with regard to high level block diagrams are illustrative with regard to the basic functionality of performance counter implementations.

Figure 7:
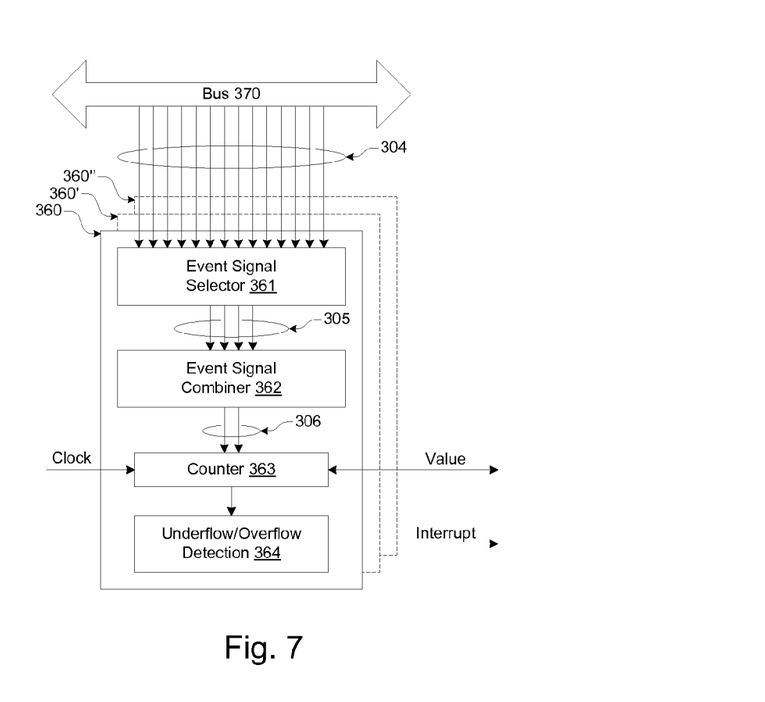
FIG. 7 schematically shows a high level block diagram of an example implementation of a configurable performance counter.

With regard to FIG. 7, a further schematic high level block diagram of an example implementation of a configurable performance counter is illustrated. The performance counter unit 360 is a representative example of each unit 360, 360' and 360" in the processing device 600. The performance counter unit 360 receives the performance related signals 304 including in particular the aforementioned event signals, state event signals, service request/interrupt signals and/or signals relating to execution-time statistics. The performance related signals are provided through an event bus 370 or a data bus operating a protocol to transport the performance related signals.

The performance counter unit 360 includes an event signal selector 361, and event signal combine 362 and counter 363. The event signal selector 361 receives event signals 304 from the processing system 600 and issues signals 305 to the event signal combiner 362. The event signal combiner 362 is coupled to the counter 363 by signals 306. The counter 363 is coupled to the processing system 600 by read/write (R/W) data line and interrupt line.

During the operation of the processing device 600, instructions of an application program are executed. When a certain condition triggers a performance related event 304, the processing device 600 and detector circuitries thereof may generates an event signal on the bus 370. The performance counter unit 360 receives the event signals 304 generated by the processing system 600 and detector circuitries thereof. Each other performance counter unit 360' and 360" may receive the same event signals 304 as the performance counter unit 360. The event signal selector 361 selects a subset of event signals from the event signals 304. The event signal selector 361 may be configurable by software executed on the processing device 600 to select a subset of zero, one or more event signals from the event signals 304.

The event signal combiner 362 receives the event signals 305 of the subset selected by the event signal selector 361, and combines these signals 305 to produce new event signals 306 that enables or triggers the counter 363 to increase/decrease by a predetermined increment/decrement. An accumulated count associated with the new event signals 306 is maintained in the counter 363. An underflow/overflow detector 364 operably coupled to the counter 363 may issue an interrupt signal on an interrupt line when the accumulated count of the counter 363 underflow or overflow. The processing device 600 may read or write the counter 363 via R/W data lines to obtain an ongoing analysis of the performance of the computer system 600 with respect to the new event signals 306. The processing device 600 may also write to the counter 363, such as to preset the counter 363 to a predetermined value.

As briefly introduced above, measures have to be put in place to reduce the risk of interference if software applications with different functional safety criticality is executed in one computing shell. Functional safety criticality is associated with a level of the safety integrity, which is required in a specific use case. A performance interference may reduce the performance of the processing unit while processing a safety critical software application due to interference of a second software application having a different level of safety criticality. The present patent application suggests a methodology implemented in hardware detecting possible performance interferences such that measures can be taken to react or counteract within a short period of time in order to maintain and/or restore the functionality of a functional safety circuital application.

Safety critical software application represents software, an inadvertent action of which might be directly responsible for death, injury, occupational illness, or significant operation, or a result of an action of which would be relied on for decisions, which might cause death, injury, or other significant actions. Safety critical application is typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

Hence, it is understood that an encapsulation of applications having different safety criticality is of increasing interest. An encapsulation in the address domain is for instance obtained by using memory protection units (MPU) or memory management units (MMU). However, encapsulation in the performance domain is currently handled by imprecise time based measures, so called watchdogs. Watchdog timer require a periodic trigger. Within the critical task respective trigger points are included. At these trigger points the watchdog timer is software-triggered. However the precision to trigger these timers is not very high, as an application may take longer or shorter dependent on the data processed (data dependent on instruction execution times), input dependent data, the number of loops to be passed, etc.

The safety interference unit according to examples of the present patent application therefore introduces a measurement of inferences in the performance domain instead of the time domain. Such action allows for reducing the safety risk that one safety critical application interferes with a second application causing dangerous malfunction due to too low processing performance because of interference. By detecting interferences, the processing system may be switched into a safe state before a malfunction thereof may result in harms of the health or the life of users. The detection of interference should be performed in a time span shorter than the time an erroneous system requires to endanger health of life of people, the so-called fault tolerant time interval. The performance of a computing shell is characterized by the amount of useful work accomplished by a computing shell compared to the time. For instance an embedded computing shell performance, but not limited thereto, involves in particular the following:

response time for a given piece of functionality, e.g. an interrupt, and throughput, which is the rate of processing work.

Targeting performance domain interference of applications executed in a time sharing environment by one computing shell requires quantifying disturbances due to inferences in the performance domain. In particular, inferences occur due to sharing of state based resources.

The currently used called timeout watchdog or window watchdog to measure the time duration an application and a task thereof requires to complete its execution. However, processing shells are less deterministic in the time domain, for instance because of more and more speculative operations performed within a processor or processor core. In case the speculations are correct, the results are available earlier, however, in case the speculations are wrong the same instruction requires longer. Further, the hierarchical memory system including different levels of date and/or instruction caches also tries to speculatively pre-fetch and store data and instructions. In case the speculative fetches were correctly predicted, execution time is fast, however it may slow down significantly the performance in case predicted behavior did not meet the application behavior. The execution time relies heavily on the executed instructions, the processed data, the number of context switches (interrupt) etc. As a consequence the time windows for time domain performance monitoring using timeout watchdogs or window watchdogs have to be wider and wider.

Figure 8:
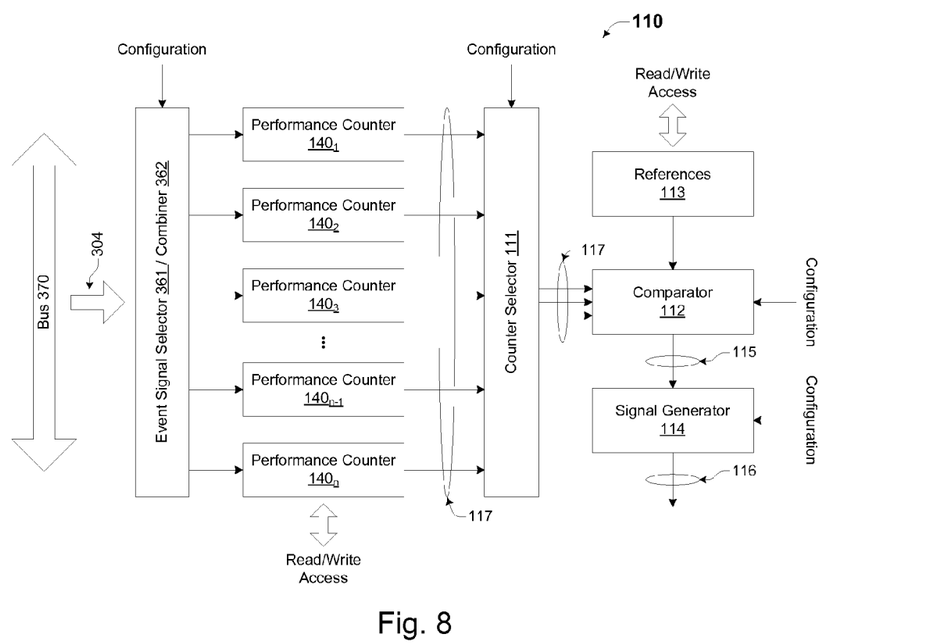
FIG. 8 schematically shows a block diagram of a safety interference unit according to an example of the present application.

Referring now to FIG. 8, a block diagram of a safety interference unit 110 according to an example of the present patent application is schematically illustrated. The safety interference unit 110 comprises or has access to one or more performance counters $140_1$ to $140_n$, which have been described with references to various illustrative examples thereof. As exemplified above, a logic, in particular a configurable, may be provided to detect event signals 304 communicated over a bus 370 are any other suitable one or more signal lines to an event signal selector 361 and/or event signal combiner 362, which passes or generates (clock, enable) signals for a respective one of the performance counters $140_1$ to $140_n$, which increase or decrease their counter values in response to the passed/generated signals. Accordingly, one or more performance related events are associated or associatable with an individual performance counter $140_1$ to $140_n$. The performance related events are detected and signalized by detector circuitries provided at or within specific parts of the processing device as illustrated above with respect to the exemplary performance counters.

The values of the performance counters may be accessible for read and/or write operations. A read access operation retrieves the current value of the performance register. A write access operation set, resets and/or initialize the performance counter to for instance a specific value, which may be a predefined value or default value. Depending where the counters are located, the value thereof may be read out either as a set of registers, or as a set of memory locations through memory mapped registers (MMR) or memory-mapped input/output (MMIO). The performance counters may be accessed by hardware and/or software.

The performance counters $140_1$ to $140_n$ may be 32-bit counters. However, in other examples, other counter sizes may be used. The safety interference unit 110 may for instance comprise a plurality of registers, which are utilised as an interface to the performance counters $140_1$ to $140_n$ to count performance relevant events.

The safety interference unit 110 may further comprise a counter selector 111, which is in particular configurable, to select one or more values retrieved from the performance counters $140_1$ to $140_n$ for being analyzed in order to detect any interferences on the basis of the values obtained from the performance counters $140_1$ to $140_n$. The counter selector 111 is operatively connected to the one or more performance counters $140_1$ to $140_n$.

The selected performance counter values are supplied by the counter selector 111 to a comparator 112 operatively coupled thereto. The comparator 112 is configured to analyze the performance counter values supplied thereto. The performance counter values to be analyzed may comprise counter values of one or more selected performance counters $140_1$ to $140_n$. The comparator 112 of the safety interference unit 110 may be configurable. For instance, the comparator 112 may be configurable to compare the performance counter values supplied thereto with respective reference values, which may be implemented as a set of registers of as a set of memory locations through memory mapped registers (MMR) or memory-mapped input/output (MMIO). The reference values may be accessible for read and/or write operations. A read access operation retrieves one or more reference values. A write access operation set, resets and/or initialize one or more references values to for instance specific values, which may be predefined values or default values.

The comparator 112 may be configured to compare the performance counter values with the respective reference values in order to detect whether the performance counter values are within boundary conditions defined on the basis of the reference values. In particular, the comparator 112 may be configured to detect overflow or underflow of the performance counter values with respect to respective reference values representing overflow and/or underflow threshold values and to generate a detection signal 115 in case a performance interference is detected. The detection signal is to be supplied to a signal generator 114 generating an interference indication signal in response to the detection signalized by the comparator 112.

In a further example of the present application, the comparator 112 may be configured to calculate a convolution value of performance counter values of one or more selected performance counters and reference values. The reference values may be obtained during the development of the functional safety circuital application for instance by simulation runs in combination with one or more further applications. A convolution value calculated by the comparator 112 below a threshold, which is specific for the functional safety circuital application, is indicative of a processing flow of the functional safety circuital application differing from the expected/intended processing flow defined on the basis of the reference values. The convolution value may be understood to represent a value representative of the level of matching of the processing flow monitored on the basis of the performance counters and the values thereof. The higher the level of matching the more similar the processing flow with the expected/intended one.

Figure 9:
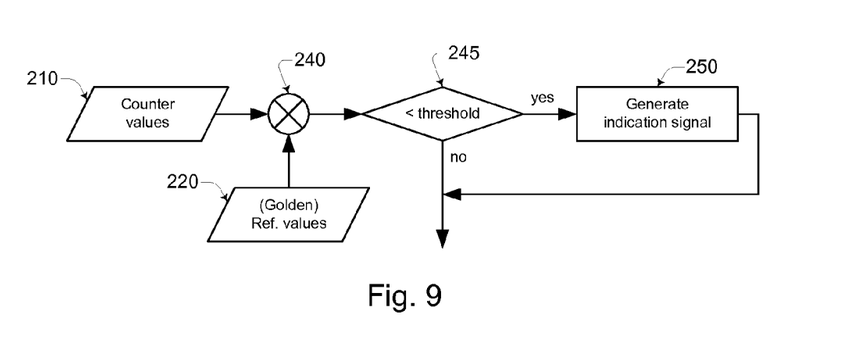
FIGS. 9 and 10 schematically show functional block diagrams of exemplary implementations of a convolution based comparator 112 according to examples of the present application.
Figure 10:
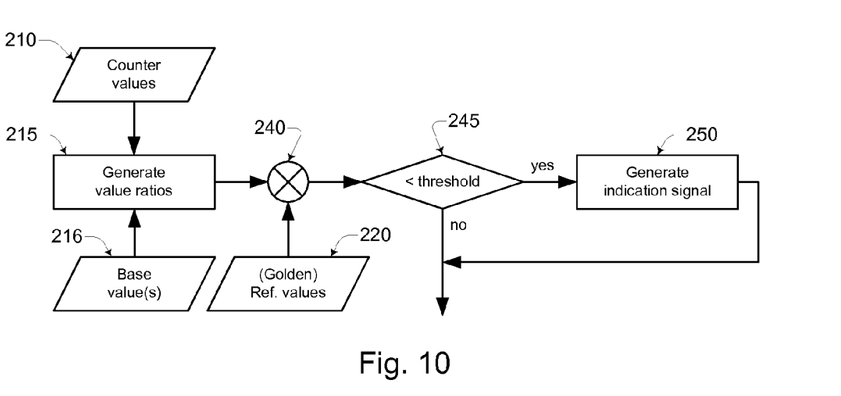

Schematic implementations of a convolution based comparator 112 are exemplified with reference to FIGS. 9 and 10. Performance counter values 210 of one or more selected performance counters are convolved with reference values 220, in particular predetermined reference values, and the convolution result is compared with a threshold value 245, in particular a predetermined threshold value. The convolution 240 may be applied to performance counter values of one or more selected performance counters or the convolution may be applied to ratios determined from the performance counter values of one or more selected performance counters. The performance counter value ratios may be obtained by applying 215 a base value 216 or individual base values. The base values may be a time dependent value in order to obtain ratios representing time-normalized performance counter values. For instance, the ratios may be normalized with respect to a period of time, over which the performance counters have been counted the signalized performance related events.

In case that the convolution value is below the threshold 245, an indication signal may be generated 250, which indicates that counter values of the selected performance counters differ from the expected/intended counter values, in turn may indicate that the processing flow (e.g. the processing behavior of the application) differs from the expected processing flow (e.g. the expected processing behavior of the application). The threshold may be understood to define a degree of difference or degree of similarity and is in particular configurable. With respect to the examples of FIGS. 9 and 10, the reference values (e.g. golden reference values), the base values and/or the threshold may be implemented as a set of registers of as a set of memory locations through memory mapped registers (MMR) or memory-mapped input/output (MMIO).

The comparator 112 may repeatedly perform the comparison operation, in particular cyclically and more particularly periodically. The repetition of the comparison operation performed by the comparator 112 may be configurable.

In case the detected performance interference determined by the comparator 112 is out of bound, e.g. too low interference or too high interference with respect to underflow and overflow thresholds, respectively, or the processing flow of an application does not show the expected behavior, an interference indication signal in time domain or value domain signal may be generated and signalized by an interference signal generator 114 of the safety interference unit 110. The interference signal generator 114 operably coupled to the comparator 112 may be arranged to generate different interference indication signals, which comprises:

an interference indication signal may be a service request or may cause a service request, which may be directed to the functional safety critical application, which enabled the functional safety critical application to react and repair interference issues in real time for instance in that the functional safety critical application is executed at a higher priority level, which enables the functional safety critical application to have assigned a larger share of the total processing time shared among the applications executed at the processing system;

an interference indication signal may be a hardware fault signal or may cause a hardware fault signal, which switches the processing unit or processing system, at which the functional safety critical application is executed into a failsafe state as the detected interference may infringe the safety function or safety requirements thereof;

an interference indication signal may be a hardware fault signal or may cause a hardware fault signal, which triggers a reboot (e.g. a reset) of the processing device or processing system or components thereof, at which the functional safety critical application is executed; and an interference indication signal may be a hardware fault signal or may cause a hardware fault signal, which disables one or more components of the processing device or processing system, at which the functional safety critical application is executed, in particular one or more input/output (IO) components may be disabled such as serial multiplexed bus communication e.g. CAN or FlexRay communication to mention some known communication standards.

The interference signal generator 114 is configurable. In some examples, the generator 114 is configurable to generate signals dependent on one or more performance counter values, on the basis of which the comparator 112 has detected an interference.

It should be noted that "configurability" of the safety interference unit 110 and components thereof should be understood in that a programming interface such as an application programming interface (API) is provided, through which a configuration of the safety interference unit 110 and components thereof is obtainable.

Moreover, one or more components of the safety interference unit 110 may be software implemented, in particular, one or more software-implemented components of the safety interference unit 110 may be executed as a privileged application at a same processor core or as an application at another processor core in order to ensure that the detection of application interferences is performed at a predefined reliability level with regard to its functionality and responsiveness.

Figure 11:
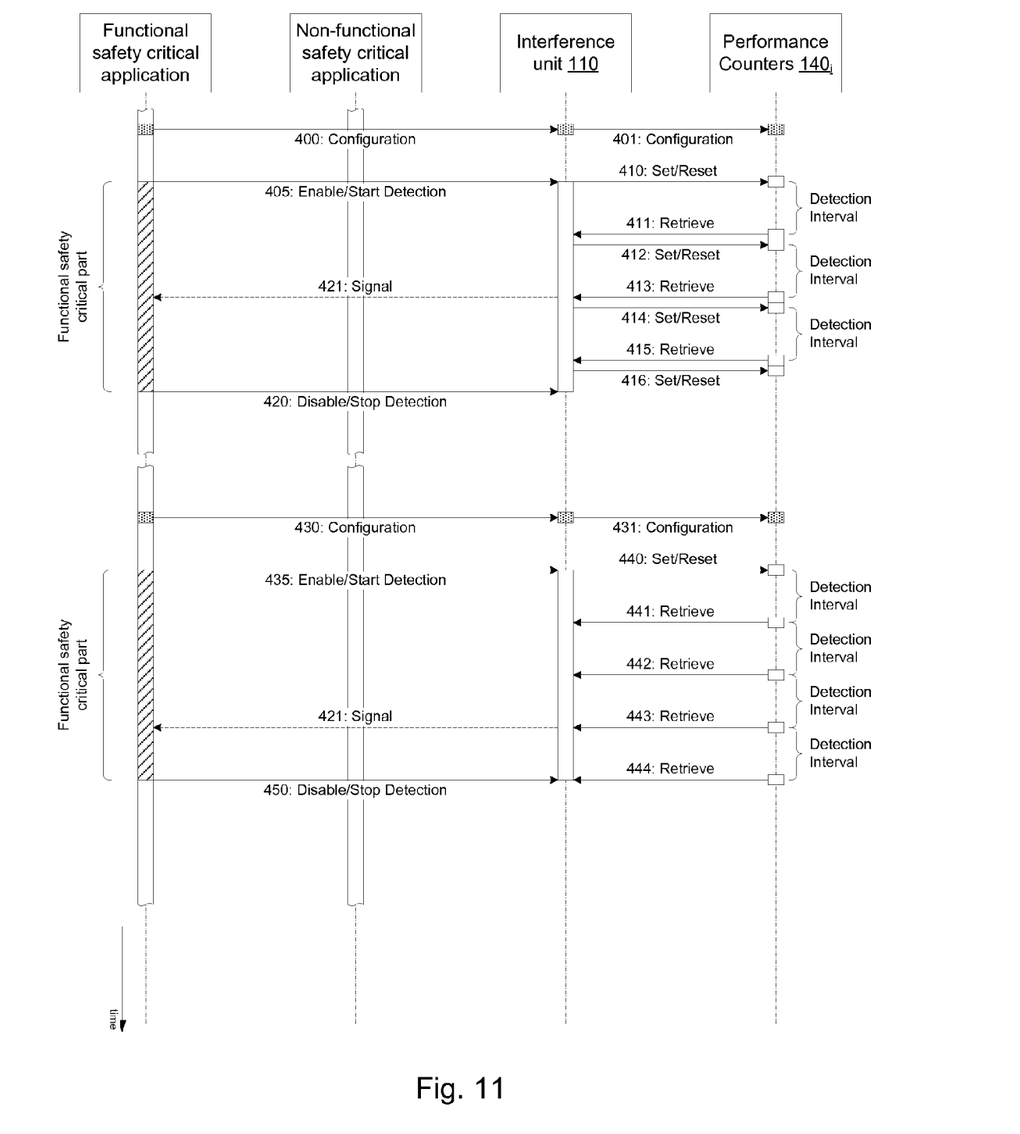
FIG. 11 schematically shows a time diagram of an operation of an exemplary safety interference unit according to the present application.

Referring to FIG. 11, a time sequence diagram schematically illustrating interference detection with regard to an example computing shell, within which a functional safety critical application and a non-functional safety critical application are executed. The non-functional safety critical application should be understood to be representative of one or more application, which are non-functional safety critical or have a functional safety critical level lower than that of the functional safety critical application. The individual instructions of the applications are executed in time sharing at the same computing shell providing shared resources for the applications. The execution of the exemplified functional safety critical application may one or more sections of the execution flow subjected to functional safety criticality and one or more sections subjected to a functional safety criticality of a lower safety level including non-safety relevant level. The interference detection is operated at least during the execution of execution flow sections subjected to a functional safety criticality.

As illustratively shown in FIG. 11, at a stage 400 the safety interference unit 110 is configured, which may include the configuration of the performance counters 140$_i$. The configuration may comprise a configuration, in accordance with which performance counters are to be monitored by the safety interference unit 110, and may further comprise a configuration of the performance counter logic to count the respective events. The configuration may be performed by the functional safety critical application. In particular, functional safety critical application may configure the reference values, base values and/or thresholds of the safety interference unit 110 e.g. through an application programming interface (API).

The safety interference detection may be automatically started upon configuration of the safety interference unit 110 or, as illustratively shown, upon an instruction e.g. from the functional safety critical application to the safety interference unit 110 at stage 405. In conjunction with the instruction to start detection of interferences, the performance counters 140$_i$, the values of which are monitored by the safety interference unit 110, may be set or reset to a predetermined values.

The safety interference unit 110 then retrieves the performance counter values of the performance counter 140$_i$ selected in accordance with the configuration in order to detect interferences on the basis of the comparison operation performed at the safety interference unit 110 with respect to the reference values. As illustratively shown in FIG. 11, the safety interference unit 110 may repeatedly retrieve the performance counter values in accordance with detection intervals, e.g. stage 411, 413, and 415. After each retrieval, the selected performance counters 140$_i$ may be again set or reset to predetermined values, e.g. stages 412, 414, and 416.

The detection intervals may be equidistant in time, for instance triggered by a timer internal or external to the safety interference unit 110. In general, the detection intervals may have the same length in time or vary in length, may be regular or may be periodically.

The monitoring and detection of interference events by the safety interference unit 110 may be stopped or suspended upon an instruction e.g. from the functional safety critical application to the safety interference unit 110 at stage 420.

During the monitoring of the performance counter values, the safety interference unit 110 may detect an interference event. As described above, upon detection of an interference event by the safety interference unit 110 an interference indication signal is generated and issued e.g. to the functional safety critical application as illustratively shown at stage 421.

With reference to the stages 430 to 450, an operation of an exemplary safety interference unit 110 is illustratively shown, which monitors the performance counter values normalized against time. Accordingly, the performance counter values may be retrieved in accordance with a detection interval and normalized with respect to the detection time interval. A setting or resetting of the performance counter values may be omitted in this case.

Those skilled in the art understand on the basis of the above description that the properties and features described with respect to one or more examples may also apply to and/or combinable with other examples.

According to an example of the present application, an exemplary apparatus for detecting software interference comprises a processor and at least one shared resource forming a computing shell, which is configured to execute a first, functional safety critical application and at least one second application in time-shared operation, one or more performance counters, each of which is configured to adjust a counter value in response to a performance related event detected at the apparatus in response to execution of the first and the at least one second applications, a reference value storage, which is configured to store one or more threshold values, wherein each of the one or more reference values is associated with one of the one or more performance counters, a comparator, which is operatively coupled to the one or more performance counters and configured to receive the one or more counter values therefrom, to compare the one or more counter values with the respective threshold value retrieved from the reference value storage and to generate at least one comparison signal in response to results of the one or more comparisons, and an interference indication generator, which is operatively coupled to the comparator to receive the at least one comparison signal and configured to generate at least one interference indication in response to the at least one received comparison signal.

According to an example of the present application, the comparator is further configured to detect underflow and/or overflow of the counter values with respect to the respective threshold value.

According to an example of the present application, the comparator is further configured to calculate a convolution value on the basis of the one or more counter values received from the one or more performance counters and one or more reference value retrieved from the one or more reference value storage configured to store the one or more reference value.

According to an example of the present application, the comparator is further configured to calculate counter value ratios on the basis of one or more base values, wherein the one or more ratio base values comprises at least one or a period of time and one or more ratio base values each associated with one of the one or more performance counters. The comparator is also configured to compare the one or more counter value ratios with the respective threshold value retrieved from the reference value storage.

According to an example of the present application, the interference indication comprises at least one of an interference indication to the functional safety critical application; an interference indication to the processor for switching into a failsafe state; an interference indication to trigger a reboot of the processor; and an interference indication signal to disable one or more components of the processor.

According to an example of the present application the apparatus for detecting software interference further comprises a counter selector operably inter-coupled between the performance counters and the comparator is configured to select a subset of performance counters form the one or more performance counters and to supply the counter values of the selected subset of performance counters to the comparator.

According to an example of the present application, a method for detecting software interference between a first, functional safety critical application and at least one second application executed in time-shared operation in a computing shell formed of a processor and at least one shared resource is suggested. One or more performance counter values are received from one or more performance counters each configured to adjust a counter value in response to a performance related event detected at the apparatus in response to execution of the first and the at least one second applications. The one or more performance counter values are compared with the respective threshold value retrieved from a reference value storage configured to store the one or more threshold values, wherein each of the one or more reference values is associated with one of the one or more performance counters. At least one comparison signal is generated in response to results of the one or more comparisons. And at least one interference indication is issued in response to the at least one received comparison signal.

Thus, examples of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Thus, the computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Examples of the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented, which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the interference counter may be integrated within a processor core, or be a separate module within a computing system, operable to communicate with the processor core, for example. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus for detecting software interference, comprising
    a processor and at least one shared resource forming a computing shell, which is configured to execute a first, functional safety critical application and at least one second application in time-shared operation;
    one or more performance counters each configured to adjust a counter value in response to a performance related event detected at the apparatus in response to execution of the first and the at least one second applications;
    a reference value storage configured to store one or more threshold values, wherein each of the one or more reference values is associated with one of the one or more performance counters;
    a comparator operatively coupled to the one or more performance counters and configured to receive the one or more performance counter values therefrom, to compare the one or more performance counter values with the respective threshold value retrieved from the reference value storage and to generate at least one comparison signal in response to results of the one or more comparisons; and
    an interference indication generator operatively coupled to the comparator to receive the at least one comparison signal and configured to generate at least one interference indication in response to the at least one received comparison signal;
    wherein the comparator is further configured to calculate a convolution value on the basis of the one or more counter values received from the one or more performance counters and one or more reference value retrieved from the one or more reference value storage configured to store the one or more reference value.

2. The apparatus of claim 1,
    wherein the comparator is further configured to detect underflow and/or overflow of the counter values with respect to the respective threshold value.

3. The apparatus of claim 1,
    wherein the comparator is further configured to calculate counter value ratios on the basis of one or more base values, wherein the one or more ratio base values comprises at least one of a period of time and one or more ratio base values each associated with one of the one or more performance counters,
    wherein the comparator is further configured to compare the one or more counter value ratios with the respective threshold value retrieved from the reference value storage.

4. The apparatus of claim 1,
    wherein the interference indication comprises at least one of an interference indication to the functional safety critical application; an interference indication to the processor for switching into a failsafe state; an interference indication to trigger a reboot of the processor;

and an interference indication signal to disable one or more components of the processor.

5. The apparatus of claim 1, further comprising
a counter selector operably inter-coupled between the performance counters and the comparator and configured to select a subset of performance counters from the one or more performance counters and to supply the counter values of the selected subset of performance counters to the comparator.

6. A method for detecting software interference between a first, functional safety critical application and at least one second application executed in time-shared operation in a computing shell formed of a processor and at least one shared resource, the method comprising:
receiving one or more performance counter values from one or more performance counters each configured to adjust a performance counter value in response to a performance related event detected at the apparatus in response to execution of the first and the at least one second applications;
comparing the one or more performance counter values with the respective threshold value retrieved from a reference value storage configured to store the one or more threshold values, wherein each of the one or more reference values is associated with one of the one or more performance counters;
generating at least one comparison signal in response to results of the one or more comparisons;
issuing at least one interference indication in response to the at least one received comparison signal;
calculating a convolution value on the basis of the one or more counter values received from the one or more performance counters and one or more reference value retrieved from the one or more reference value storage configured to store the one or more reference value.

7. The method of claim 6,
detecting underflow and/or overflow of the counter values with respect to the respective threshold value.

8. The method of claim 6,
calculating counter value ratios on the basis of one or more base values, wherein the one or more ratio base values comprises at least one or a period of time and one or more ratio base values each associated with one of the one or more performance counters, and
comparing the one or more counter value ratios with the respective threshold value retrieved from the reference value storage.

9. The method of claim 6,
wherein the interference indication comprises at least one of an interference indication to the functional safety critical application; an interference indication to the processor for switching into a failsafe state; an interference indication to trigger a reboot of the processor; and an interference indication signal to disable one or more components of the processor.

10. The method of claim 6, further comprising selecting a subset of performance counters from the one or more performance counters and supplying the counter values of the selected subset of performance counters to the comparator by a counter selector operably inter-coupled between the performance counters and the comparator.

11. Non-transitory, tangible computer-readable storage medium having stored thereon a computer program for detecting software interference between a first, functional safety critical application and at least one second application executed in time-shared operation in a computing shell formed of a processor and at least one shared resource, the computer program comprising a set of instructions, which, when executed on the processor, cause the processor to perform the method comprising:
receiving one or more performance counter values from one or more performance counters each configured to adjust a counter value in response to a performance related event detected at the apparatus in response to execution of the first and the at least one second applications;
comparing the one or more counter values with the respective threshold value retrieved from a reference value storage configured to store the one or more threshold values, wherein each of the one or more reference values is associated with one of the one or more performance counters;
generating at least one comparison signal in response to results of the one or more comparisons;
issuing at least one interference indication in response to the at least one received comparison signal;
calculating a convolution value on the basis of the one or more counter values received from the one or more performance counters and one or more reference value retrieved from the one or more reference value storage configured to store the one or more reference value.

* * * * *